United States Patent [19]

Prottengeier et al.

[11] Patent Number: 5,427,214
[45] Date of Patent: Jun. 27, 1995

[54] IMPACT DAMPER FOR VEHICLES

[75] Inventors: Edgar Prottengeier, Nürnberg; Wolfgang Nagl, Allersberg, both of Germany

[73] Assignee: Suspa Compart Aktiengesellschaft, Altdorf, Germany

[21] Appl. No.: 87,454

[22] Filed: Jul. 8, 1993

[30] Foreign Application Priority Data

Jul. 8, 1992 [DE] Germany ............... 42 22 325.3
Jan. 8, 1993 [DE] Germany ............... 43 00 284.6

[51] Int. Cl.⁶ ............... B60R 19/34; B62D 21/15; B62D 25/08; F16F 7/12
[52] U.S. Cl. ............... 188/374; 188/371; 293/133
[58] Field of Search ............... 188/371, 374, 377, 372, 188/375, 376, 377; 213/220; 267/139, 140, 116; 74/492, 493; 280/777, 775; 293/133

[56] References Cited

U.S. PATENT DOCUMENTS

| | | | |
|---|---|---|---|
| 3,181,821 | 5/1965 | Webb | 188/371 |
| 3,236,333 | 2/1966 | Mitchell | 188/374 |
| 3,470,761 | 10/1969 | Okamoto et al. | 280/777 |
| 3,482,653 | 12/1969 | Maki et al. | |
| 3,899,047 | 8/1975 | Maeda et al. | 293/133 |
| 4,181,198 | 1/1980 | Lindberg | 293/133 |
| 4,445,708 | 5/1984 | Oakes et al. | |
| 4,641,872 | 2/1987 | Lohr et al. | 293/133 |
| 4,988,081 | 1/1991 | Dohrmann | 293/133 |
| 4,995,486 | 2/1991 | Garneweidner | 293/133 |
| 5,174,421 | 12/1992 | Rink et al. | 293/133 |
| 5,181,589 | 1/1993 | Siegner et al. | |

FOREIGN PATENT DOCUMENTS

| | | | |
|---|---|---|---|
| 1202308 | 8/1970 | United Kingdom | 293/133 |
| 9106786 | 5/1991 | WIPO | 188/374 |

*Primary Examiner*—Douglas C. Butler
*Attorney, Agent, or Firm*—Browdy and Neimark

[57] ABSTRACT

An impact damper for supporting a bumper of a vehicle on the latter's chassis consists of two tubes one guided within the other, the external tube having at least one inwards-directed projection reinforced by a reinforcement ring and engaging with a suited depression of the internal tube. A deformation face is formed on the projection and tapers towards the axis of the tubes.

9 Claims, 1 Drawing Sheet

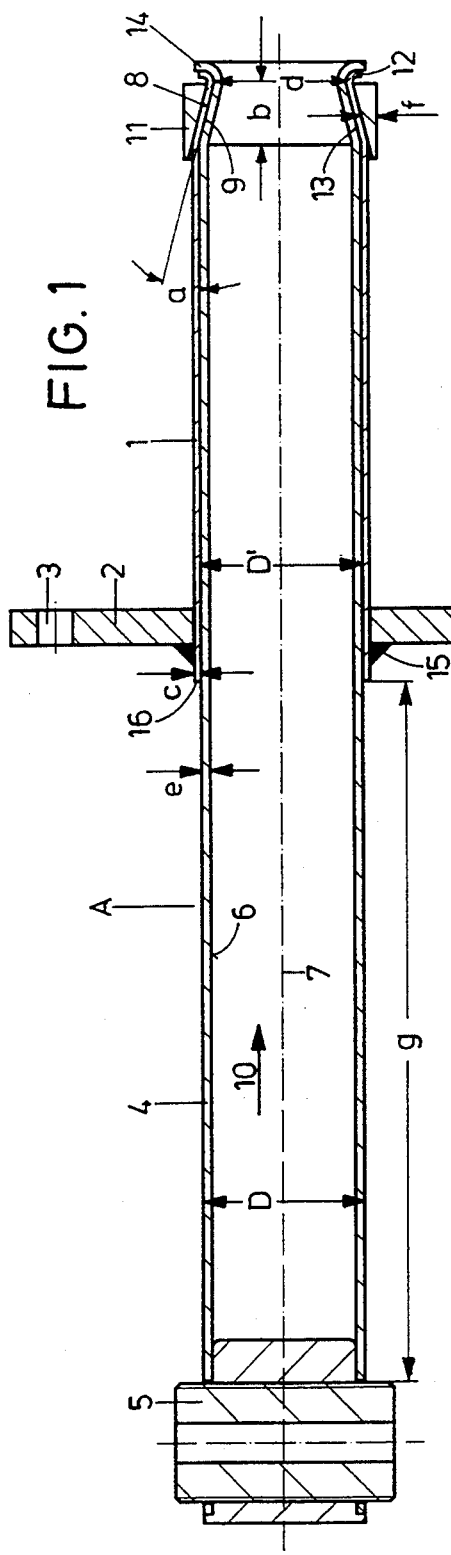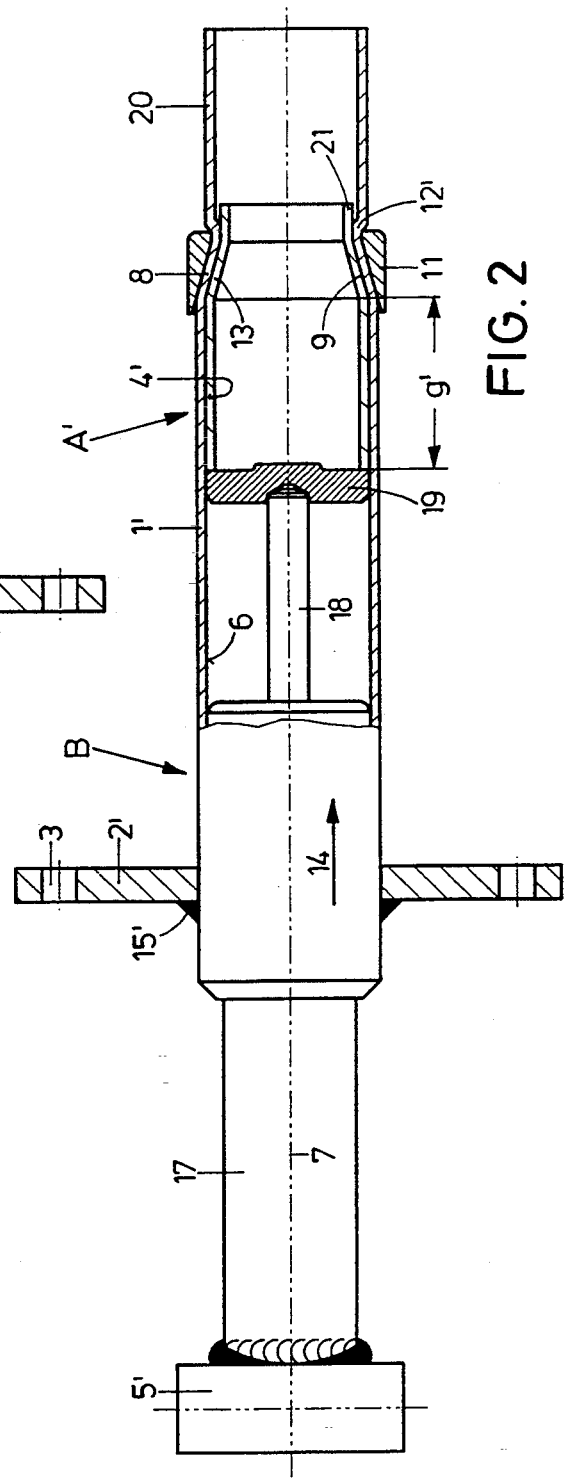

IMPACT DAMPER FOR VEHICLES

BACKGROUND OF THE INVENTION

1. Field of the Invention

The invention relates to an impact damper for vehicles, in particular for supporting a bumper of a vehicle on the latter's chassis.

2. Background Art

The connection in series of a reversible impact damper with an irreversible deformation damper is known from U.S. Pat. No. 5,181,589, the piston rod of the reversible impact damper bearing at its free end against a pressure plate which in turn bears against inwards projecting crimps of a tube. The latter are deformed outwards when the pressure plate is pushed through.

A deformation damper is known from U.S. Pat. No. 4,445,708 which has an inner tube and an outer tube. A ball cage is arranged between the inner and the outer tube; the outer tube has a conical section. When the two tubes are pushed together, the balls of the ball cage get into this conical section and deform it. This deformation damper is extraordinarily expensive.

Deformation dampers are known from U.S. Pat. No. 3,482,653 which have a deformation tube provided with a tapering or depression and a further tube provided with one or several rings which, when the deformation tube is pushed into the other tube, deform the deformation tube plastically by necking.

SUMMARY OF THE INVENTION

It is an object of the invention to embody an impact damper of the generic kind such that it is extremely simple in structure and reliable in operation.

In accordance with the invention this object is solved by the following features: an external suspension and guide tube with a central longitudinal axis and with an internal wall, a deformation tube arranged in the suspension and guide tube coaxially of the latter's axis and radially substantially free of play referred to the latter and movable into the latter in a push-in direction and having an outside diameter, a first securing element connected with the suspension and guide tube, a second securing element coupled with the deformation tube, a projection formed on the suspension and guide tube and projecting towards the axis and on which a deformation face is formed which tapers towards the axis in the push-in direction and of which a smallest inside diameter is smaller than the outside diameter of the deformation tube, a depression formed in the deformation tube, which is suited to match the projection and bears against the latter radially free of play, a reinforcement ring arranged on the exterior of the suspension and guide tube in the projection and suited to match the latter in cross-section. The projection formed on the suspension and guide tube and reinforced by way of a separate reinforcement ring deforms the deformation tube which is radially guided at least substantially in the suspension and guide tube.

Further details of the invention will become apparent from the ensuing description of two exemplary embodiments taken in conjunction with the drawing.

BRIEF DESCRIPTION OF THE DRAWING

FIG. 1 is a longitudinal section of an exemplary embodiment of an impact damper formed as a deformation damper, and FIG. 2 is a partial longitudinal section of an impact damper consisting of a reversible damper and a deformation damper.

DESCRIPTION OF THE PREFERRED EMBODIMENTS

The impact damper illustrated in FIG. 1 is a deformation damper A. It has a circular cylindrical external suspension and guide tube 1 on which a securing flange 2 is arranged which is provided with securing openings 3. The deformation damper A is fixable to the chassis of a vehicle by means of this securing flange 2.

An equally circular cylindrical deformation tube 4 is arranged in the suspension and guide tube 1, the outside diameter D of the deformation tube 4 approximately corresponding to the inside diameter D' of the suspension and guide tube 1, i.e. the deformation tube 4 rests in the suspension and guide tube 1 largely free of play, however without press-fit.

At the outer free end of the suspension and guide tube 1, a tubular securing element 5 is arranged by means of which the deformation damper A can be connected with another part of a vehicle, as a rule with a bumper of the vehicle. The suspension and guide tube 1 is provided with a deformation device projecting from its internal wall 6 inwards. In the deformation damper A according to FIG. 1, this deformation device is formed by an annularly circumferential projection 8 formed on the suspension and guide tube 1 and projecting inwards towards the latter's central longitudinal axis 7. This projection 8 has a deformation face 9 in the shape of a truncated cone which flatly tapers towards the axis 7 in the push-in direction 10 of the deformation tube 4 into the suspension and guide tube 1 and which extends at an angle a referred to the internal wall 6 of the suspension and guide tube 1. This angle a is about between 5° and 20°. In the vicinity of the projection 8, a conical reinforcement ring 11 is slipped on to the suspension and guide tube 1, the inner shape of which ring matching the outer shape of the projection 8 so that it rests on the latter radially without play. This is attained by a bead 12 of the suspension and guide tube 1 arranged subsequent to the deformation face 9 in the push-in direction 10.

The projection 8 engages with a depression 13 of the deformation tube 4 suited to match the projection 8 in cross-section. This depression is finished by a bead 14 formed at the end of the deformation tube 4 and resting on the bead 12 from outside. As long as there is no deformation force acting on the deformation tube 4 in the push-in direction 10, the deformation tube 4 is thus arranged axially non-displaceably in the suspension and guide tube 1.

The production of the projection 8 and the depression 13 is made such that the deformation tube 4 is pushed into the suspension and guide tube 1, whereupon the projection 8 together with the depression 13 are produced in a single operation by the two tubes 1 and 4 being conically tapered. Then the reinforcement ring 11 is pushed on to the exterior of the projection 8. Then the two beads 12, 14 are formed in a single further operation. Within this production process, the securing flange 2 may be slipped on and connected with the suspension and guide tube 1 by means of a welding 15. However, this may as well have been realized before. The securing element 5 is fixed to the deformation tube 4 independently of this process.

Since the smallest inside diameter d of the projection 8 is smaller than the outside diameter D of the deformation tube 4, the deformation tube 4 is plastically deformed when pushed into the suspension and guide tube 1 in the push-in direction 10. $0.72\,D \leq d \leq 0.86\,D$ applies. This defines the dimension of plastic deformation. The flatly tapering structure of the deformation face 9 prevents peak loads at the beginning of the deformation process, i.e. at the beginning of the push-in process in push-in direction 10. On the other hand, during the entire deformation process, the deformation itself takes place steadily along the axial length b of the projection 8, i.e. the reduction of the outside diameter of the deformation tube 4 from the great diameter D to the small diameter corresponding to the smallest inside diameter d of the projection 8 takes place along the axial length b of the projection 8.

While the deformation tube 4 is subject to considerable deformation forces when pushed into the suspension and guide tube in the push-in direction 10, the suspension and guide tube 1 does not have to take up such deformation forces in the direction radial to the axis 7. These are taken by the reinforcement ring 11. This is why the wall thickness c of the suspension and guide tube 1 may be smaller than the wall thickness e of the deformation tube 4. $1\,mm \leq c \leq 2\,mm$ applies to the wall thickness c, and $1.5\,mm \leq e \leq 3\,mm$ applies to the wall thickness e. The suspension and guide tube 1 on the one hand and the deformation tube 4 on the other hand may consist of normal constructional steel, i.e. in the range of St 37 to St 52. They may also consist of aluminium, in which case the wall thicknesses c and e are to be adjusted. When the reinforcement ring 11 also consists of normal constructional steel, it is useful for the average wall thickness f of the reinforcement ring 11 to exceed the wall thickness e of the deformation tube 4. $2\,mm \leq f \leq 6\,mm$ and preferably $2.5\,mm \leq f \leq 4\,mm$ applies. When the reinforcement ring 11 is of a steel of a stability higher than machining steel or cold-formed steel, its average wall thickness f may be in the lower range. As seen in the drawing, the wall thicknesses of the projection 8 and of the depression 13 are not less than the corresponding wall thicknesses c and e.

As seen in FIG. 1, the deformation tube 4 can be pushed into the suspension and guide tube 1 in the push-in direction 10 by a length which is smaller than the distance g of the securing element 5 from the end 16 facing it, of the suspension and guide tube 1.

The deformation damper may of course be coupled with a reversible impact damper B as it is known in basic structure from U.S. Pat. No. 5,181,589. As show in FIG. 2, such a reversible impact damper B has a cylindrical housing 17 on which a securing element 5' is arranged. The housing 17 engages with a suspension and guide tube 1' and is displaceable relative to the latter in the direction of the axis 7. On the free end of a piston rod 18 of the reversible impact damper B, a pressure plate 19 is arranged which bears against a deformation tube 4'. A securing flange 2' is fixed to the suspension and guide tube 1' by means of a welding 15'. In this embodiment the suspension and guide tube 1' additionally has a tube section 20 contiguous to a bead 12' of the projection 8. In this embodiment, the depression 13 of the deformation tube 4' is not finished by a bead resting on the bead 12', but by a short cylinder section 21 which projects into the tube section 20 of the suspension and guide tube 1'. The tube section 20 and the cylinder section 21 are not necessary for the function of the deformation damper A'. The wall thicknesses are identical, $1.5\,mm \leq c$ and $e \leq 3\,mm$ applying.

In case of a collision, the housing 17 is first pushed into the suspension and guide tube 1' in the push-in direction 10, whereby the piston rod 18 is entered into the housing 17, since at this time the pressure plate 19 is arrested in relation to the suspension and guide tube 1. In this case energy is changed into heat. When the piston rod 18 has been moved into the housing 17 as far as possible—without the total energy to be absorbed being changed into heat—then the deformation tube 4' is pushed by the pressure plate 19 in the push-in direction 10 through the deformation device of the deformation damper A', i.e. through the projection 8. During this the deformation tube 4 is plastically deformed in the way described.

For this combined embodiment of an impact damper B and a deformation damper A', the length along which the deformation tube 4' can be plastically deformed is dearly smaller than in the exemplary embodiment of a pure deformation damper A according to FIG. 1. This length corresponds at maximum to the distance g' between the pressure plate 19 and the projection 8.

As far as the deformation damper A' has not been described in the foregoing, reference is made to the above description of FIG. 1.

What is claimed is:

1. An impact damper of vehicles, for supporting a bumper of a vehicle on the latter's chassis, comprising the following features:
    an external suspension and guide tube (1,1') with a central longitudinal axis (7) and with an internal wall (6);
    a deformation tube (4,4') arranged in the suspension and guide tube (1,1') coaxially of the latter's axis (7) and radially substantially free of play with regard to the latter and movable into the latter in a push-in direction (10) and having an outside diameter (D);
    securing flange (2,2') provided with securing openings (3) and fixable to the chassis of the vehicle, said securing flange (2,2') being connected with the suspension and guide tube (1,1') and surrounding the suspension and guide tube (1,1') and the deformation tube (4,4') and arranged between a first end and a second end of the impact damper;
    a securing element (5,5') being arranged adjacent to said first end of said impact damper and being connectable with the bumper of the vehicle and coupled with the deformation tube (4,4');
    a projection (8) formed on the suspension and guide tube (1,1') and projecting towards the axis (7) and on which a deformation face (9) is formed which tapers towards the axis in the push-in direction (10) and of which a smallest inside diameter (d) is smaller than the outside diameter (D) of the deformation tube (4,4');
    a depression (13) formed in the deformation tube (4,4'), which is suited to match the projection (8) and bears against the latter radially free of play;
    a reinforcement ring (11) arranged on the exterior of the suspension and guide tube (1,1') in the projection (8) and suited to match the latter in cross-section;
    the projection (8) arranged adjacent to the second end of the impact damper and securing flange (2,2')

being provided between said projection (8) including the depression (13) and the reinforcement ring (11) and the securing element (5,5').

2. An impact damper according to claim 1, wherein the suspension and guide tube (1) has a bead (12, 12') extending away from the axis (7) and partially overlapping the reinforcement ring (11) at a rear end of the latter seen in the push-in direction (10).

3. An impact damper according to claim 1, wherein the suspension and guide tube (1, 1') has a wall thickness (c) which is smaller than a wall thickness (e) of the deformation tube (4, 4').

4. An impact damper according to claim 3, wherein the reinforcement ring (11) has an average wall thickness (f) which is greater than the wall thickness (e) of the deformation tube (4, 4').

5. An impact damper according to claim 1, wherein the projection (8) with the deformation face (9) and the depression (13) are annularly circumferential.

6. An impact damper according to claim 1, wherein the deformation tube (4, 4') is guided radially substantially free of play in the suspension and guide tube (1, 1').

7. An impact damper according to claim 1, wherein the suspension and guide tube (1, 1') and the deformation tube (4, 4') have an essentially constant wall thickness (c, e) throughout their circumference and length.

8. An impact damper for vehicles, for supporting a bumper of a vehicle on the latter's chassis, comprising the following features:

an external suspension and guide tube (1,1') with a central longitudinal axis (7) and with an internal wall (6);

a deformation tube (4,4') arranged in the suspension and guide tube (1,1') coaxially of the latter's axis (7) and radially, substantially free of play with regard to the latter and movable into the latter in a push-in direction (10) and having an outside diameter (D);

a securing flange (2,2') provided with securing openings (3) and fixable to the chassis of the vehicle, said securing flange (2,2') being connected with the suspension and guide tube (1,1') and the deformation tube (4,4') and arranged between a first end and a second end of the impact damper;

a securing element (5,5') being arranged adjacent to said first end of said impact damper and being connectable with the bumper of the vehicle and coupled with the deformation tube (4,4');

a projection (8) formed on the suspension and guide tube (1,1') and projecting towards the axis (7) on which a deformation face (9) is formed which tapers towards the axis in the push-in direction (10) and of which a smallest inside diameter (d) is smaller than the outside diameter (D) of the deformation tube (4,4');

a depression (13) formed in the deformation tube (4,4'), which is suited to match the projection (8) and bears against the latter radially free of play;

a reinforcement ring (11) arranged on the exterior of the suspension and guide tube (1,1') in the projection (8) and suited to match the latter in cross-section;

the projection (8) being arranged adjacent to the second end of the impact damper and the securing flange (2,2') being provided between said projection (8) including the depression (13) and the reinforcement ring (11) and the securing element (5,5'), wherein the deformation face (9) is biased referred to the internal wall (6) of the suspension and guide tube (1,1') by an angle (a), to which $5° \leq a \leq 20°$ applies.

9. An impact damper for vehicles, for supporting a bumper of a vehicle on the latter's chassis, comprising the following features:

an external suspension and guide tube (1,1') with a central longitudinal axis (7) and with an internal wall (6);

a deformation tube (4,4') arranged in the suspension and guide tube (1,1') coaxially of the latter's axis (7) and radially substantially free of play with regard to the latter and movable into the latter in a push-in direction (10) and having an outside diameter (D);

a securing flange (2,2') provided with securing openings (3) and fixable to the chassis of the vehicle, said securing flange (2,2') being connected with the suspension and guide tube (1,1') and the deformation tube (4,4') and arranged between a first end and a second end of the impact damper;

a securing element (5,5') being arranged adjacent to said first end of said impact damper and being connectable with the bumper of the vehicle and coupled with the deformation tube (4,4');

a projection (8) formed on the suspension and guide tube (1,1') and projecting towards the axis (7) on which a deformation face (9) is formed which tapers towards the axis in the push-in direction (10) and of which a smallest inside diameter (d) is smaller than the outside diameter (D) of the deformation tube (4,4');

a depression (13) formed in the deformation tube (4,4'), which is suited to match the projection (8) and bears against the latter radially free of play;

a reinforcement ring (11) arranged on the exterior of the suspension and guide tube (1,1') in the projection (8) and suited to match the latter in cross-section;

the projection (8) being arranged adjacent to the second end of the impact damper and the securing flange (2,2') being provided between said projection (8) including the depression (13) and the reinforcement ring (11) and the securing element (5,5'), wherein $0.72\,D \leq d \leq 0.86\,D$ applies to the outside diameter D of the deformation tube (4,4') and the smallest inside diameter (d) of the deformation face (9).

* * * * *